(12) United States Patent
Kumar et al.

(10) Patent No.: US 10,878,198 B2
(45) Date of Patent: Dec. 29, 2020

(54) INTENT ARBITRATION FOR A VIRTUAL ASSISTANT

(71) Applicant: Facebook, Inc., Menlo Park, CA (US)

(72) Inventors: Anuj Kumar, Santa Clara, CA (US); Benoit Dumoulin, Palo Alto, CA (US); Wenhai Yang, Mountain View, CA (US); Rajen Subba, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 111 days.

(21) Appl. No.: 16/211,414

(22) Filed: Dec. 6, 2018

(65) Prior Publication Data
US 2019/0205386 A1   Jul. 4, 2019

Related U.S. Application Data (60) Provisional application No. 62/613,473, filed on Jan. 4, 2018.

(51) Int. Cl.
*G06F 40/30* (2020.01)
*G06N 5/04* (2006.01)
*G06N 20/00* (2019.01)
*G06F 9/451* (2018.01)

(52) U.S. Cl.
CPC ............. *G06F 40/30* (2020.01); *G06F 9/453* (2018.02); *G06N 5/043* (2013.01); *G06N 5/046* (2013.01); *G06N 20/00* (2019.01)

(58) Field of Classification Search
CPC ......... G06F 40/30; G06F 9/453; G06N 5/046; G06N 20/00; G06N 5/043; G06N 5/02; G06N 3/006
See application file for complete search history.

(56) References Cited

U.S. PATENT DOCUMENTS

| | | |
|---|---|---|
| 2010/0004924 A1 | 1/2010 | Paez |
| 2011/0238410 A1* | 9/2011 | Larcheveque ........ G06F 16/355 704/9 |
| 2012/0265528 A1 | 10/2012 | Gruber et al. |
| 2013/0110519 A1* | 5/2013 | Cheyer ............. H04M 1/72597 704/275 |
| 2016/0239568 A1* | 8/2016 | Packer .................. G06F 16/951 |
| 2016/0372109 A1* | 12/2016 | Yeracaris ............ H04M 3/4936 |
| 2017/0091629 A1 | 3/2017 | Li et al. |

(Continued)

OTHER PUBLICATIONS

PCT International Search Report and Written Opinion, PCT Application No. PCT/US2018/064482, dated Apr. 10, 2019, twenty-eight pages.

*Primary Examiner* — Stella L. Woo
(74) *Attorney, Agent, or Firm* — Fenwick & West LLP (57) ABSTRACT

A user interacts with a virtual digital assistant with the intent that it provides assistance with a task. The user sends messages to the virtual digital assistant that include content obtained via user input at a client device. An intent determination model is applied to the content to identify the user's intent. The virtual digital assistant identifies agents that are capable of servicing the intent are identified and retrieves contextual data relating to the message from a data store. An intent arbitration model is used to select one of the agents which is activated to provide assistance with the task. The contextual information may include global metrics of agent performance and/or information regarding the user's preferences.

20 Claims, 4 Drawing Sheets

(56) References Cited

U.S. PATENT DOCUMENTS

2017/0140053 A1* 5/2017 Vorobev ............... G06N 20/00
2017/0300831 A1* 10/2017 Gelfenbeyn ........... G10L 15/30
2017/0351961 A1* 12/2017 Kochura ............ G06F 16/9535
2018/0239770 A1* 8/2018 Ghotbi ................ G06F 16/338

* cited by examiner

INTENT ARBITRATION FOR A VIRTUAL ASSISTANT

CROSS REFERENCE TO RELATED APPLICATIONS

This application claims the benefit of U.S. Provisional Application No. 62/613,473, filed Jan. 4, 2018, which is incorporated by reference.

BACKGROUND

This disclosure relates generally to virtual assistants, such as electronic devices with voice assistant functionality, and in particular to selecting a provider to satisfy an intent indicated by a user of the virtual assistant.

As the availability of computing power has gone up, while the size of computing devices and associated costs have gone down, the range of uses for computing devices has increased. One area of recent growth has been virtual assistants, which are now available on many smartphones as well as through stand-alone devices. Virtual assistants interact with users to assist them in completing various tasks. For example, rather than a user opening a web browser, typing a request for the weather in the user's hometown, selecting a search result, and scrolling through the resulting webpage to determine that day's forecast, the user might just ask the assistant "what's the weather going to be like tomorrow in San Francisco?" with the intent that the virtual assistant will provide a summary of the weather forecast in response.

A given user intent may be serviceable by multiple available applications ("apps"). Some existing virtual assistant interfaces mandate that a user explicitly states the name of an app in a request to invoke a service to satisfy the user's intent. For example, the user might generally frame a command in the form "ask {app} for {phrase}". To give a more specific example, the user might state "ask Dave's Taxis for a cab" to initiate a taxi booking process with Dave's Taxis booking app. While this is a simple model, it puts the burden on the user to remember numerous application names (e.g., thousands of applications), makes discovery of potentially more useful/popular apps more difficult, and requires the user to formulate the voice command in a non-natural way.

Other existing interfaces maintain a one-to-many intent-to-app mapping, and surface all the app options to the user to pick from in response to a request indicating an intent the user wishes to have serviced. For example, the user might state "Book me a cab" to which the assistant might respond "Ok, which of these apps would you like to use: (A) Dave's Taxis, (B) Steve's Taxis, or (C) Other." The user then must follow up with a further command (e.g., stating "Dave's Taxis") to initiate the booking process through the corresponding app. This approach also shifts the burden on the user to pick the most relevant option, without knowing a-priori which option may best serve the user's intent.

In sum, among other problems, the existing interfaces may be inefficient and/or unintuitive, which leads to wasted time and user frustration. They may even lead to users giving up on the virtual assistant altogether and reverting to other approaches to complete intended tasks. Thus, improving the interface of a virtual assistant may reduce time wastage and improve the usability of computer systems.

SUMMARY

A user interacts with a virtual digital assistant with the intent that it provides assistance with a task. The virtual digital assistant determines the intent of the user based on the interactions (e.g., using natural language processing on text and/or verbal input provided by the user). In a third-party ecosystem, multiple third parties may be able to assist the user with the intended task. In various embodiments, a third-party intent arbitration service uses a machine-learned model to select which third-party the virtual digital assistant selects to serve the user's intent. Although the embodiments described focus on third-party intent arbitration, this framework may also be used for first-party versus third-party arbitration (e.g., determining whether a service provided by the same entity as the virtual assistant or one provided by a third-party should be used). In one embodiment, the intent arbitration service picks a third-party app (or other service provider) that best drives users' engagement (both current and future). In other embodiments, other goals are considered in selecting which app (or other service provider) to select for servicing a particular request.

In one embodiment, third-party intent arbitration includes receiving a message from a client device that includes content obtained from user input. An intent determination model is applied to the content to identify an intent corresponding to a task with which the user desires assistance. The third-party intent arbitration also includes identifying a plurality of agents capable of servicing the intent by providing assistance with the task and retrieving contextual data relating to the message from a data store. One of the agents is selected based on the contextual data and activated to provide assistance with the task.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A virtual assistant system receives messages from client devices indicating user intents. The virtual assistant system identifies multiple agents (e.g., apps and/or other service providers) that can service the user intents and selects agents to service the intents. In various embodiments, the intent arbitration service determines a user's intent from a received message and calculates an intent resolution score for each of a set of agents that could service the intent. An agent is selected to service the intent based on the intent resolution scores. The intent arbitration service may select agents based on a range of factors including prior engagements by the user, ease of use, usage and/or recommendations from the user's contacts on social media, etc. The intent arbitration service may tune its output over time based on metrics of user engagement and user actions relating to use of particular agents to service given intents.

System Architecture

Figure 1:
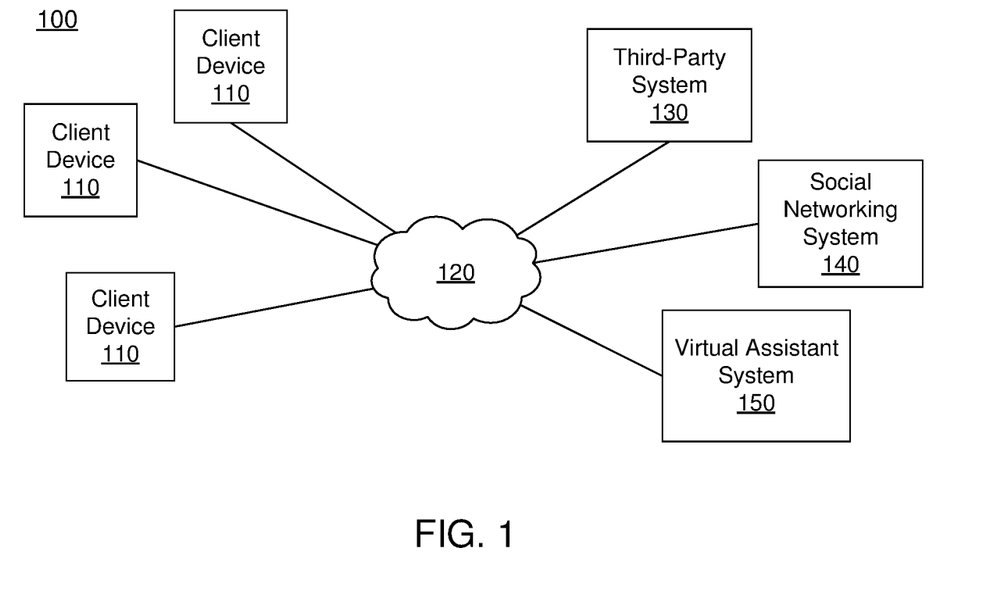
FIG. 1 is a block diagram of a system environment in which a virtual assistant operates, in accordance with an embodiment.

FIG. 1 illustrates an embodiment of a system environment 100 in which a virtual assistant may operate. The system environment 100 shown by FIG. 1 includes one or more client devices 110, a network 120, one or more third-party systems 130, a social network system 140, and a virtual assistant system 150. In alternative configurations, different and/or additional components may be included in the system environment 100. For example, functionality attributed to the social network system 140 and the virtual assistant system 150 in the description below may be provided by a single component.

The client devices 110 are one or more computing devices capable of receiving user input as well as transmitting and/or receiving data via the network 120. In one embodiment, a client device 110 is a dedicated computer system, such as a desktop or a laptop computer. Alternatively, a client device 110 may be a device having computer functionality, such as a smart speaker, a home assistant device, a mobile telephone, or another suitable device. A client device 110 is configured to communicate via the network 120. In one embodiment, a client device 110 executes an application allowing a user of the client device 110 to interact with the social network system 140. For example, a client device 110 executes a browser application to enable interaction between the client device 110 and the social network system 140 via the network 120. In another embodiment, a client device 110 interacts with the social network system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A client device 110 includes a virtual assistant. The virtual assistant can be formed of native functionality within the device, an application program ("app") executing on the device, or a combination of native and app functionality. A user of the client device 110 inputs messages to the virtual assistant. In one embodiment, a message may indicate one or more intents, which correspond to tasks with which the user desires assistance. The user input may take the form of audio, text, or any other appropriate form. For example, the user might say "order me a cab," which might correspond to the intent of booking a cab for the user with a particular service (e.g., the user's favored cab provider) from a particular location (e.g., the present location of the client device 110) at a particular time (e.g., as soon as possible). The virtual assistant communicates the message to the virtual assistant system 150 (e.g., via the network 120).

The virtual assistant system 150 receives messages from client devices 110, determines the intents corresponding to the messages, and selects agents (e.g., which of a set of apps) to service the intents. Some intents may be served by multiple agents, including third-party agents provided by entities other than the entity that operates the virtual assistant system 150. For a given message having an intent served by multiple agents, the virtual assistant system 150 uses a variety of factors to select a particular agent to service the intent. The virtual assistant system 150 then instructs the selected agent to service the intent. For example, the virtual assistant system 150 may send instructions to the virtual assistant executing on the client device 110 to cause the virtual assistant to activate a selected agent (e.g., an app) to service the request. Alternatively, the virtual assistant system 150 may send instructions to service the intent directly to the selected agent.

The virtual assistant system 150 improves the operation of the client device 110, and a virtual assistant executing in association with the client device by making the client device easier to use. When a user sends a message to the virtual assistant with a particular intent, the user need not specify which of multiple agents should be used. Rather, the virtual assistant system 150 identifies the agent that will service the request. As a result, usage of the client device, the virtual assistant, and the virtual assistant system is improved with respect to speed, accuracy, and usability, relative to conventional systems. The virtual assistant system 150 is described in greater detail below, with reference to FIG. 3.

One or more third-party systems 130 may be coupled to the network 120 for communicating with the other entities on the network. The third-party systems 130 are operated by third parties, as opposed to the first party that is operating the virtual assistant system 150. In one embodiment, a third-party system 130 is an app provider communicating information describing applications for execution by a client device 110 or communicating data to client devices for use by an app executing on the client device. Some or all of the third-party systems 130 may service one or more intents. In other embodiments, a third-party system 130 provides content or other information for presentation via a client device 110. A third-party system 130 may also communicate information to the social network system 140, such as information about an app provided by the third-party system 130.

Figure 2:
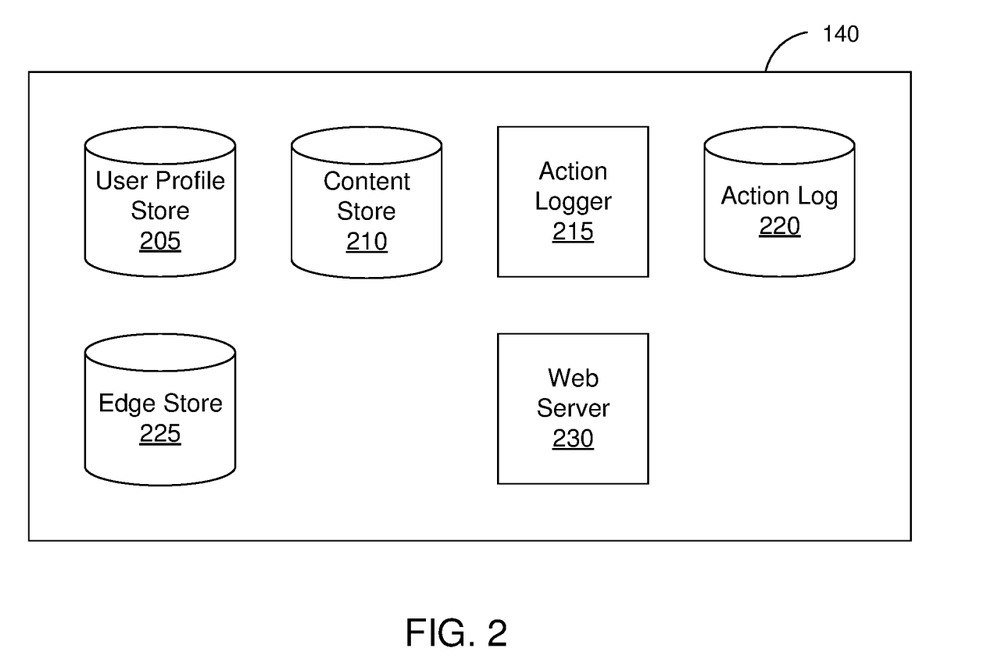
FIG. 2 is a block diagram of the social network system of FIG. 1, in accordance with an embodiment.

FIG. 2 illustrates an embodiment of the social network system 140. The social network system 140 shown in FIG. 2 includes a user profile store 205, a content store 210, an action logger 215, an action log 220, an edge store 225, and a web server 230. In other embodiments, the social network system 140 may include additional, fewer, or different components for various applications. Components such as network interfaces, security functions, load balancers, failover servers, management and network operations consoles, and the like may be included in the social network system 140 but are not shown so as to not obscure the details of the system architecture.

Each user of the social network system 140 is associated with a user profile, which is stored in the user profile store 205. A user profile includes declarative information about the user that was explicitly shared by the user and may also include profile information inferred by the social network system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social network system 140, user profiles may also be stored for entities such as businesses or organizations. This allows an entity to establish a presence on the social network system 140 for connecting and exchanging content with other social network system users. The entity may post information about itself, about its products or provide other information to users of the social network system 140 using a brand page associated with the entity's user profile. Other users of the social network system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social network system users may create objects stored by the content store 210, such as status updates, photos tagged by users to be associated with other objects in the social network system 140, events, groups or applications. In one embodiment, objects in the content store 210 represent single pieces of content, or content "items." Hence, online system users are encouraged to communicate with each other by posting text and content items of various types of media to the social network system 140 through various communication channels. This increases the amount of interaction of users with each other and increases the frequency with which users interact within the social network system 140.

The action logger 215 receives communications about user actions internal to and/or external to the social network system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social network system 140 to track user actions on the social network, as well as actions on third-party systems 130 that communicate information to the social network system. Users may interact with various objects on the social network system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social network system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social network system 140 as well as with other applications operating within the system environment 100. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website or third-party app, and communicated to the social network system 140. For example, an e-commerce website may recognize a user of the social network system 140 through a social plug-in enabling the e-commerce website to identify the user, or a third-party app that provides transport services may recognize a user of the social network system because the user has previously linked an account with the third-party app with an account in the social network. Because users of the social network system 140 are uniquely identifiable, third parties, such as those in the preceding examples, may communicate information about a user's actions outside of the social network system to the social network system for association with the user. Hence, the action log 220 may record information about actions users perform on a third-party system 130, including webpage viewing histories, advertisements that were engaged, purchases made, and other patterns from shopping and buying. Additionally, actions a user performs via a third-party application associated with a third-party system 130 and executing on a client device 110 may be communicated to the action logger 215 by the application for recordation and association with the user in the action log 220.

In one embodiment, the edge store 225 stores information describing connections between users and other objects on the social network system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social network system 140, such as expressing interest in a page, sharing a link with other users, and commenting on posts made by other users. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social network system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social network system 140 over time to approximate a user's interest in an object or in another user in the social network system based on the actions performed by the user. A user's affinity may be computed by the social network system 140 over time to approximate the user's interest in an object, in a topic, or in another user in the social network based on actions performed by the user. In one embodiment, multiple interactions between a user and a specific object may be stored as a single edge in the edge store 225. Alternatively, each interaction between a user and a specific object is stored as a separate edge. In some embodiments, connections between users may be stored in the user profile store 205, or the user profile store 205 may access the edge store 225 to determine connections between users.

The web server 230 links the social network system 140 via the network 120 to the one or more client devices 110, as well as to the one or more third-party systems 130 and the virtual assistant system 150. The web server 230 serves web pages, as well as other content, such as JAVA®, FLASH®, XML and so forth. The web server 230 may receive and route messages between the social network system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, or BlackberryOS.

Figure 3:
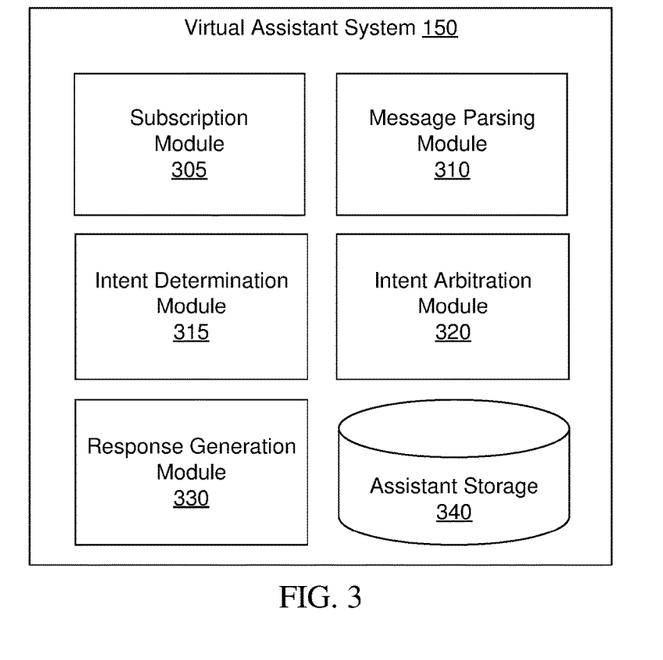
FIG. 3 is a block diagram of the virtual assistant system of FIG. 1, in accordance with an embodiment.

FIG. 3 shows one embodiment of the virtual assistant system 150, configured for use in the system environment 100. In the embodiment shown, the virtual assistant system includes a subscription module 305, a message parsing module 310, an intent determination module 315, an intent arbitration module 320, a response generation module 330, and assistant storage 340. In other embodiments, the virtual assistant system 150 contains different and/or additional elements. In addition, the functions may be distributed among the elements in a different manner than described.

The subscription module 305 provides an interface for third-party entities to subscribe to service intents. In one embodiment, the interface is a webpage that includes controls for third-parties to select intents and provide an agent that services the intent. The agent may be an app that users download to client devices 110 and/or an on-line service that client devices may access via the network 120. The provider of the virtual assistant system 150 may perform some initial screening (e.g., ensuring that the agent does not contain malicious code, confirming that the agent services the corresponding intent, etc.). Depending on the specific agent, users may have to install the agent on their client devices 110 before it may service the corresponding intent or the agent may operate entirely in the cloud (e.g., by executing on a third-party system 130 and exchanging messages with the virtual assistant on a user's client device 110).

Figure 4:
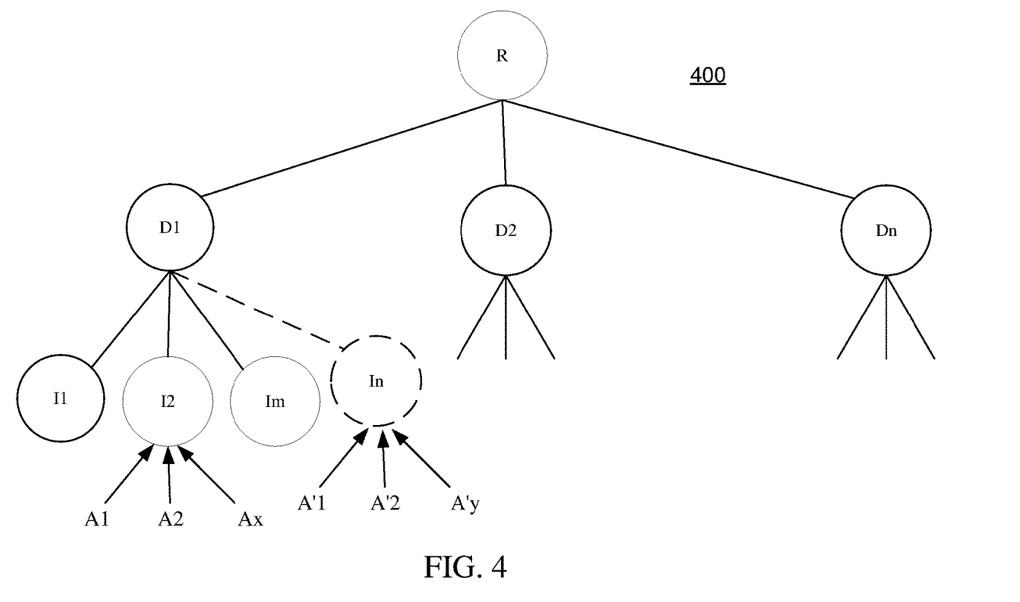
FIG. 4 is a block diagram illustrating an ontology of intents used by a virtual assistant system, in accordance with an embodiment.

FIG. 4 illustrates one embodiment of an ontology of intents in different domains that agents may subscribe to using the subscription module 305. In the embodiment shown, the ontology 400 has a root node, R, that serves as a single reference for the entire ontology. Within the ontology there are several domains $D_1, D_2, \ldots, D_n$. A domain is a general class of intents that a user might wish to have serviced. For example, a first domain, $D_1$, might be organizing transport, a second domain, $D_2$, might be making a phone call, etc. Within each domain there are several intents, $I_1, I_2, \ldots, I_m$. Although intents are only shown for the first domain $D_1$, each domain in the ontology includes a set of intents. Each intent may correspond to a specific desire that a user wishes to have serviced by an app (or other service provided). For example, in the domain for organizing transport services there might be intents of booking a cab immediately, booking a cab for a future trip, booking a cab for someone else etc.

Agents (e.g., third-party apps or services) can subscribe to service an intent using the interface provided by the subscription module 305. For example, in FIG. 4, one of the intents, $I_2$, is subscribed to by several agents $A_1, A_2, \ldots, A_x$. Once subscribed to an intent, an agent becomes eligible to be selected to service that intent by the intent arbitration module 320. In one embodiment, the subscription module 305 assigns an agent identifier (e.g., a unique ID number). The subscription module 305 stores the agent identifiers of agents subscribed to an intent in the corresponding node in the ontology 400. For example, the agent identifiers for agents A1, $A_2$, and $A_x$ may be stored in node $I_2$. Note that the provider of the intent arbitration service may also service some or all of the intents as a first-party provider. Furthermore, although only intents 12 and $I_n$ are shown as having agents subscribed to them for convenience, each intent may (and likely will) have one or more agents subscribing to it.

In some embodiments, the subscription module 305 also enables third parties to define new intents, which can then be subscribed to by other agents. The creator of an intent model may sell subscriptions on a marketplace. For example, in FIG. 4, a third-party has defined a new intent, $I_n$, which is serviced by the third-party's agent $A'_1$. The new intent, $I_n$, has also been subscribed to by other agents $A'_2$ to $A'_y$. In one embodiment, a third-party defines a new intent by submitting an intent determination model for identifying the intent in received messages and indicating where in the ontology 400 the intent should reside. Assuming the new intent is approved by the provider of the virtual assistant system 150 (or if approval is not required), a node is added to the ontology 400 for the new intent in the position indicated by the submitting third-party (thus making it available for agent subscription) and the intent determination model is stored (e.g., in the assistant storage 340) for use by the intent determination module 315.

The virtual assistant system 150 may perform quality assurance checks (either at the time of creation of a new intent and/or on an on-going basis) to ensure that the intent is desirable. For example, the quality assurance checks may determine whether the new intent is duplicative of an existing intent, whether the new intent is sufficiently well defined, and/or whether the model leads to overgrabbing (meaning it identifies the intent in a significant number of messages that should not correspond to the intent), etc. The creator of a new intent may temporarily or permanently receive marketplace credit for creating the intent that increases the likelihood of the creator's agents being selected to service intents. Marketplace credit is described in greater detail below, with reference to the intent arbitration module 320.

Referring back to FIG. 3, the message parsing module 310 receives messages from the client devices 110 and processes them to generate messages in a standardized form. In one embodiment, if a message includes an audio recording of verbal utterances, the message parsing module 310 may apply a speech-to-text algorithm to convert the audio into text. Alternatively, the audio may be converted to text by the client device 110 before it is sent to the virtual assistant system 150. Thus, regardless of the original form of the input, the message may be represented by a text string.

In some cases, a message may include an ambiguous reference to an entity. One type of ambiguity arises from a term or phrase that is specific to the user (e.g., "Mom" rather than the user's mother's name). In one embodiment, the message parsing module 310 can resolve the ambiguity by comparing the reference to social network data (e.g., retrieved from the social network system 140) for the user. Thus, in the example of the user's mother, the message parsing module 310 may determine a name and/or user ID of the user's mother from an edge object stored in the edge store 225 connecting the user and their mother. The message parsing module 310 may then substitute the determined name or user ID for the term "Mom" in the message.

Another type of ambiguity arises from the use of a pronoun in a message. For example, a user may state "what time is Mom's appointment today?" followed by "book her a taxi." The request to book a taxi does not explicitly indicate that it is for the user's mother. The message parsing module 310 can resolve the ambiguity based on previous interactions between the user and the virtual assistant. In one embodiment, the message parsing module 310 calculates relevance scores for entities referenced in the interactions between the user and the virtual assistant. The score for an entity may be based on one or more factors, including the number of references to the entity and the recency of references to the entity. A pronoun may then be resolved as referring to a particular entity based on the relevance scores (e.g., by selecting the entity with the highest relevance score). In the previous example, the message parsing module 310 might resolves "her" as referring to the user's mother due to the recent mention of the user's mother and substitute the pronoun with the user's mother's name or user ID.

The intent determination module 315 identifies one or more intents in the message. In various embodiments, the intent determination module 315 applies one or more intent determination models to the message that output a likely user intent or intents. An intent determination model may include heuristic rules, a machine-learned model (e.g., a trained neural network), or a combination of both. In one embodiment, an intent determination model applies heuristic rules to identify a set of possible intents based on whether a message includes specific words or phrases and then applies a machine-learned model (or models) to determine whether the message corresponds to an intent in the set. For example, a heuristic rule may state that "book a taxi" is a possible intent for any messages that include one of the words taxi, cab, car, or ride. The intent determination module 315 may then apply a machine-learned classifier to determine whether the message corresponds to the intent of booking a taxi as opposed to some other intent.

Regardless of the specific model or models used, the intent determination module 315 outputs one or more intents for the message. In one embodiment, the intent determination module 315 acts as a binary classifier that outputs one or more intents for the message. In other words, it is "all or nothing," determining that any given intent is either present or not present for the message. In another embodiment, the intent determination module 315 determines a likelihood (e.g., a percentage score) that the message corresponds to each possible intent (e.g., each intent serviced by the virtual assistant system 150). The intent determination module 315 may output one or more intents based on the likelihoods (e.g., the intent with the highest likelihood, any intent with a likelihood above a threshold, or the like). Where multiple intents are output, the virtual assistant system 150 may send a request to the client device 110 from which the message originated to select the desired intent (e.g., via user input) or may send the intents to the intent arbitration module 320 to be serviced. As described previously, the number of intents serviced may be increased over time by adding new intent determination models (either by the provider of the virtual assistant system 150 or by third parties) or by updating existing intent determination models.

The intent arbitration module 320 selects an agent (e.g., an app or service) to service the intent (or intents) determined from the message. In various embodiments, the intent arbitration module 320 applies an intent arbitrator model to calculate an intent resolution score for each agent in a set of possible agents. The set of possible agents may include any agent that is installed or otherwise available (e.g., as a cloud-based service) on the client device 110 from which the message was received. Which agents are available on the client device 110 may be determined based on information in the user's profile (e.g., stored in the user profile store 205), received from the client device 110 (e.g., metadata included in the message), and/or information previously collected by the virtual assistant (e.g., stored in the virtual assistant store 340). Alternatively, the set of possible agents may include all agents subscribed to the intent, with any required installation and/or setup before use being an input to the intent arbitrator model. For example, the intent arbitration module 320 may disfavor selecting uninstalled apps due to the inconvenience to the user but still recommend such an app if other factors indicate that the user will respond positively to the app (e.g., the app is relatively new and has received excellent feedback from several of the user's contacts in a social network).

Regardless of the specific method used to determine which agents are included in the set of possible agents, the intent arbitration module 320 selects an agent from the set based on the intent resolution scores (e.g., by selecting the app with the highest score). The intent arbitrator model may use heuristic rules, a machine-learned model, or a combination of both to calculate the intent resolution scores. An intent resolution score indicates the likelihood that using the corresponding model to service the intent will result in a positive outcome.

In one embodiment, a training module (not shown) trains the intent arbitration model to calculate the intent resolution scores using a training set of message-outcome pairs. A message-outcome pair includes a message determined as have the intent being scored for and an outcome of servicing that intent with a particular agent. The message-outcome pairs may be split into positive examples, meaning instances where the outcome was positive, and negative examples, meaning instances where the outcome was negative. Whether an outcome is positive or negative may be determined by a human operator and/or from user engagement data collected by the virtual assistant system 150. User engagement data may be any data available to the virtual assistant system (e.g., data collected directly by the virtual assistant system, data stored by the online system 140, and/or data stored by third party systems 130) that is indicative of whether users considered the outcome of having their intents serviced by the agents was positive.

Positive outcomes may be indicated by the user: completing the process of having the intent serviced by the agent, submitting positive feedback for the agent, recommending the agent to others, having explicitly requested use of the agent to service future instances of the same intent, and/or any other indication that the user is satisfied with the servicing of the intent. Conversely, negative outcomes may be indicated by the user: "barging-in" after the agent is selected and the selection is reported back to the user (e.g. "No not [company 1] but [company 2]"), uninstalling or deactivating the agent, having explicitly requested use of a different to service future instances of the same intent, and/or any other indication that the user is dissatisfied with the servicing of the intent. Thus, the message-outcome pairs indicate which agents are popular and which agents fail to satisfy user intent.

The training module creates ordered lists of features (referred to as "feature vectors") for the messages in the training set. The features for a message are variables deemed potentially relevant to whether the corresponding outcome is positive or negative. The features may be extracted from contextual data relating to the message. In this context, contextual data means any information available to the virtual assistant system 150 (e.g., stored in the assistant storage 340 and subject to any privacy-based restrictions) regarding: the user that sent the message, the user's contacts in the online system 140, and each agent subscribed to service the intent.

In various embodiments, the extracted features include global features for the agents and features that are specific to the user. Global features for an agent may include: metrics of the agent's historical performance (e.g., number of installs, number of uninstalls, total number of invocations using the virtual assistant, etc.), agent quality metrics (e.g., agent star rating and number of reviews, in aggregate and/or for most the most recent agent version), agent popularity and enablement velocity (e.g., a rate at which usage of the agent is increasing, a number of new users of the agent, a percentage increase in the total number of users of the agent, etc.), historical performance of a developer of the agent (e.g., average ratings of other agents or apps made by the developer), and the like. Features that are specific to the user may include: prior engagement data for the user (e.g., which agent the user previously selected to service the intent, recency of usage of the agent, etc.), prior engagement data for the user's social network contacts (e.g., which agents the user's contacts have previously selected to service the intent, recency of usage of the agents, etc.), user-specific feedback data (e.g., feedback provided by the user after having the intent serviced by one or more of the subscribed agents), recommendations from the user's contacts on social media, comments made by the user's contacts regarding an agent on social media, agent availability (e.g., whether an agent is already ready for use via the user's client device 110 or whether use of the agent would require installation and/or setup), user location at the time the message was sent, device type from which the message was sent, time of day at which the message was sent, day of week on which the message was sent, and/or other personalization features based on the user's profile (e.g., demographics, etc.). In some embodiments, the extracted features may also include economic considerations, such as: price, current promotions, credits for developing intent models, agreements with the provider of the virtual assistant system 150, etc.

In some embodiments, the training module applies dimensionality reduction (e.g., via linear discriminant analysis (LDA), principle component analysis (PCA), or the like) to reduce the amount of data in the feature vectors for messages to a smaller, more representative set of data. The training module may use supervised machine learning to train the intent arbitration model, with the feature vectors of the training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The intent arbitration model, when applied to the feature vectors for messages, outputs predictions of whether the corresponding outcomes were positive or negative. The predictions may be Boolean yes/no estimates or scalar values representing probabilities. Differences between the predictions and the ground truth (as indicated by the outcomes in the message-outcome pairs) are used to update the model (e.g., using backpropagation)

In some embodiments, a validation set is formed of additional message-outcome pairs, other than those in the training set. The training module applies the trained intent arbitration model to the messages of the validation set to quantify the accuracy of the intent arbitration model. Metrics that may be used to quantify accuracy include: precision=TP/(TP+FP) and recall=TP/(TP+FN), where precision is how many outcomes the intent arbitration model correctly predicted (TP or true positives) out of the total predicted (TP+FP or false positives), and recall is how many outcomes the intent arbitration model correctly predicted (TP) out of the total number of messages that corresponded to the outcome (TP+FN or false negatives). The F score (F-score=2*PR/(P+R)) unifies precision and recall into a single measure. In one embodiment, the training module iteratively re-trains the intent arbitration model until the occurrence of a stopping condition, such as the accuracy measurement indication that the model is sufficiently accurate (e.g., the F score exceeds a threshold), or completion of a designated number of training rounds.

Once trained (and validated, if validation is performed), the intent arbitrator model may be applied to predict, for each agent in a set, an intent resolution score for servicing an intent for which the ground truth is not already known. The intent resolution score for a given agent indicates an overall probability that the servicing the intent with that agent will yield a positive outcome. Therefore, a low score could indicate that an agent is: less used by the user or the user's contacts in the social network system 140, generally poorly rated in user feedback, often disabled or uninstalled by users, rarely selected by users if given a choice, likely to be replaced by a higher quality agent serving the same intent, etc. Conversely, a high score could indicate that the agent is: used often by the user or the user's contacts in the social network, generally rated highly in user feedback, rarely disabled or uninstalled by users, unlikely to be replaced with another agent, etc.

To enable new agents to be added in the ecosystem (or newly updated agents that previously received poor feedback), some embodiments provide mechanisms for agent exploration. Without such a mechanism, new agents may struggle to gain traction as the intent arbitration module 320 may tend to select established agents with a large amount of positive feedback over new agents with little feedback. Similarly, agents that previously received poor feedback may not be selected by the model, even if significant improvements are made.

This may be addressed by dedicating the servicing of a subset of intents to testing new (or recently updated) agents, referred to as an agent exploration subset. The agent exploration subset may be defined globally (e.g., ten percent percentage of all intents are serviced by new agents) or individually by intent (e.g., ten percent of requests to book a taxi are serviced by a new agent). An agent exploration subset of a desired size may be obtained by setting an exploration probability that controls the likelihood that any given intent serviced will be included in the subset. Thus, the intent arbitration module 320 may select different agents in response to the same (or similar) requests.

In one embodiment, the intent arbitration module 320 considers all available (e.g., all subscribed) agents in selecting an agent to service an intent that is not in the exploration subset. In contrast, for an intent in the exploration subset, the intent arbitration module 320 identifies a subset of subscribed agents that meet one or more exploration criteria and selects the agent to use to service the intent from among the subset of agents. The exploration criteria indicate that an agent is new or recently updated relative to other agents that are subscribed to the intent and may include: having subscribed to the intent within a threshold period of time (e.g., the last month), having been updated within a threshold period of time (e.g., the last week), having less than a threshold number of uses (e.g., less than ten thousand), etc. Thus, one set of users might have an intent serviced by an established agent while another set might have the same intent serviced by a new (or recently updated) agent. If there is a wide range of possible agents for a given intent, the exploration process can be treated as a multi-armed bandit problem.

In another embodiment involving agent exploration, users may be prompted whether they want to try a new agent or stick with an established one that they have used previously. In a further embodiment, a hybrid approach is used. The intent arbitration module 320 may start by using explicit user feedback (e.g., by prompting whether the user wishes to try a new agent), and then switch to using a machine-learned model to automatically select agents once the model can make selections with a desired level of confidence.

Arbitration for a third-party intent may consider additional factors based on a third party's contributions to the virtual assistant ecosystem. Third parties may get credit for contributing new intent models to a market place. The magnitude of the credit may be based on quality and/or popularity factors for the intent models. In one embodiment, a third-party intent model may be assigned a quality score based on a number of uses of the intent in the ecosystem, a number of subscribers to the intent, user feedback resulting service of instances of the intent identified by the intent model, results of any quality assurance checks performed by the provider of the assistant ecosystem, etc.

If a third-party intent model has a quality score indicating it is high quality (e.g., a high quality score), the intent arbitration model may be more likely to select an agent servicing the intent created by the same third-party that provided the intent model than apps created by other third parties. For example, the intent arbitration module 320 may boost the intent determination score for the agent based on the quality score. This boost may be permanent or temporary (e.g., the boost may be large when the intent model is first created to give the creator first-mover advantage and reduce over time to encourage competition in servicing the intent). In some embodiments, the quality score (or scores) of intent models provided by a third-party may also impact the likelihood that the third-party's apps for servicing other intents will be selected during arbitration.

The response generation module 330 generates and sends responses to messages. In one embodiment, a response is sent to the client device 110 from which the corresponding message originated. The response includes instructions to activate the agent that was selected by the intent arbitration module 320. The client device 110 activates the agent identified in the response causing the agent to perform one or more functions that service the intent identified in the message. In another embodiment, the response generation module 330 activates the agent directly by sending the response to the agent (e.g., a third-party system 130). In this case, the response includes information about the message, including identifying information for the originating client device 110 (e.g., a user name or phone number). The agent then communicates with the client device 110 (e.g., via the network 120) to service the intent.

The assistant storage 340 can be one or more computer-readable storage media that store data used by the virtual assistant system 150. In one embodiment, the assistant storage 340 stores one or more machine-learned models that are used by the intent arbitration module 320, the intent ontology 400, and contextual data used as input for the intent arbitration model. Although the assistant storage 340 is shown as a single entity within the virtual assistant system 150, it may be split across multiple storage media and locations (e.g., a distributed data store located as a server farm). For example, some or all of the contextual data may be stored by the online system 140 (e.g., in the user profile store 205, content store 210, and/or edge store 225) and accessed by the virtual assistant system 150 via the network 120.

Example Machine Architecture

Figure 5:
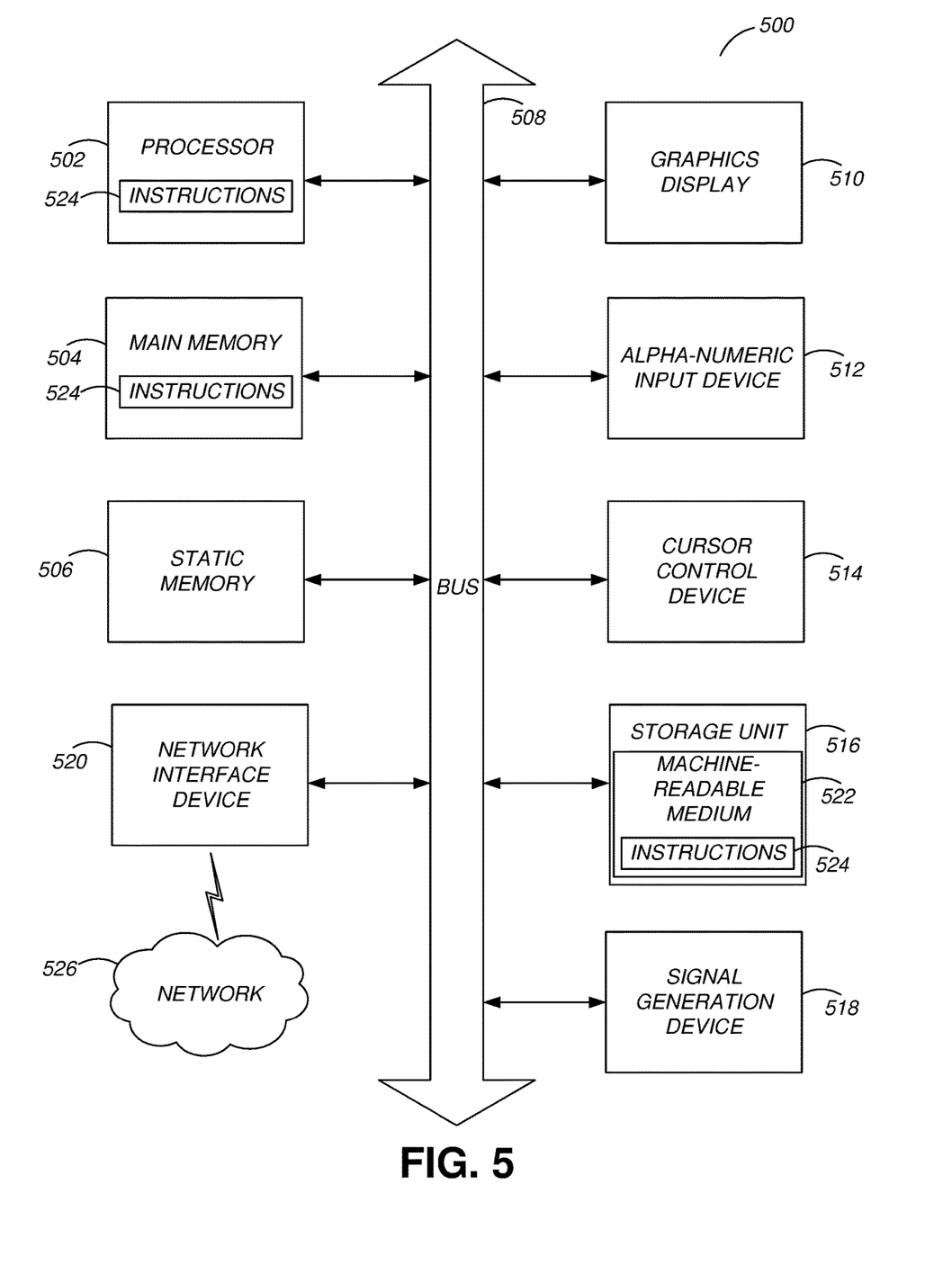
FIG. 5 illustrates a computer suitable for use in the system environment of FIG. 1, in accordance with an embodiment.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein, including those associated, and described, with the components of the existing system 110, data store 120, and/or data integrity system 130. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally one or more processors 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 502 may refer to a single processor or multiple processors. The computer system 500 also includes a main memory 504. The computer system may include a storage unit 516. The processor 502, memory 504, and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 570 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Example Intent Arbitration Method

Figure 6:
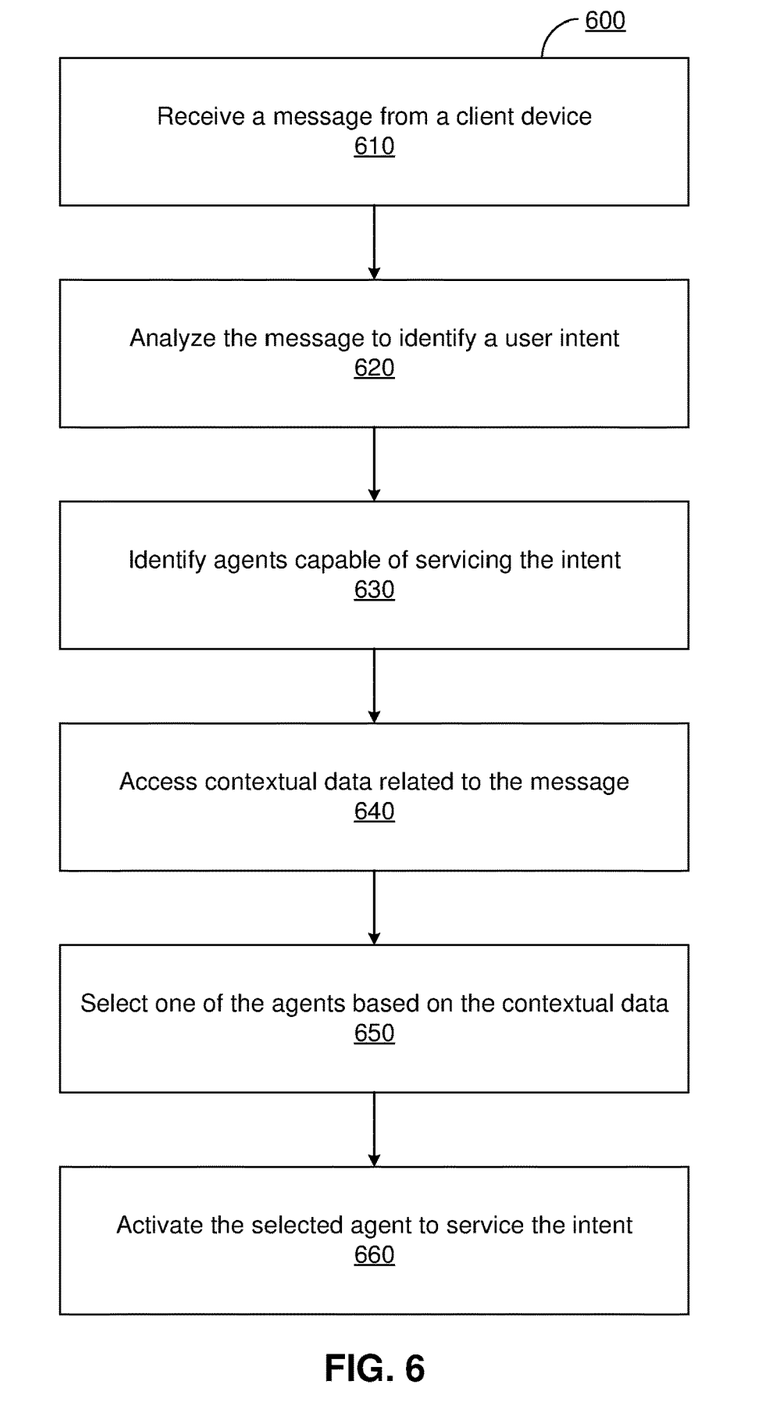
FIG. 6 is a flowchart illustrating a third-party intent arbitration method, in accordance with an embodiment.

FIG. 6 illustrates one embodiment of a method 600 for selecting an agent to service an intent from a set of agents capable of servicing the intent. The steps of FIG. 6 are illustrated from the perspective of the virtual assistant system 150 performing the method 600. However, some or all of the steps may be performed by other entities and/or components. In addition, some embodiments may perform the steps in parallel, perform the steps in different orders, or perform different steps.

In the embodiment shown in FIG. 6, the method 600 begins with the virtual assistant system 150 receiving 610 a message from a client device 110. The message includes content provided by a user of the client device 110 (e.g., using a virtual assistant app on the client device). The content may include text, audio, and/or any other type of content.

The intent determination module 315 analyzes 620 the message to identify the intent of the user in sending the message. The intent corresponds to a task with which the user wishes the virtual assistant to provide assistance. As described previously, the intent determination module 315 may use heuristics, a machine-learned model, or a combination of both to determine the user's intent.

The intent arbitration module 320 identifies 630 a set of agents that are capable of servicing the intent by providing assistance with the task. In one embodiment, the set of agents includes all agents (e.g., third-party apps) that are subscribed to the intent in the intent ontology 400. This may include an agent that is either integrated with the virtual assistant or provided by the same entity as the virtual assistant system 150 (e.g., a first-party app). To identify 630 the set of agents, the intent arbitration module 320 may search the ontology 400 to identify the node corresponding to the identified intent and retrieve identifiers (e.g., agent IDs) of the agents subscribed to that intent. In another embodiment, the set includes only those agents that are subscribed to the intent and currently available at the client device 110. For example, if using a particular agent would require the user to install a new app on the client device, that agent may not be included in the set. As another example, if the user has previously disabled a particular agent, that agent may be omitted from the set.

The intent arbitration module 320 accesses 640 contextual information related to the message. In one embodiment, all of the contextual information used by the intent arbitration module 320 is stored in the assistant storage 340. Alternatively, some or all of the contextual information may be accessed remotely (e.g., via the network 120). For example, in some embodiments, the intent arbitration module 320 retrieves some or all of the contextual data on demand from one or more third party systems 130 and/or the online system 140.

In some embodiments, the contextual information includes other interactions between the user and the virtual assistant, such as previous messages between the user and the virtual assistant (e.g., message sent to and/or from the virtual assistant), previous instances of the virtual assistant recommending an agent to service an intent, user feedback on previous instances of an intent being serviced by an agent, and the like. The contextual information may also include information about the user and/or the user's social network contacts, such as demographic information, recommendations of agents posted in the social network 140, other feedback regarding agents provided by the user's social network contacts, and the like.

The intent arbitration module 320 selects 650 one of the agents to service the intent by based on the contextual information. As described previously, the intent arbitration module 320 may use heuristic rules, a machine-learned model, or a combination of both to select 650 the agent.

Regardless of how it is selected 650, the virtual assistant system 150 activates 660 the selected agent to service the intent of the user by providing assistance with the corresponding task. Activating 660 the selected agent may involve sending a message to the client device 110 from which the message originated identifying the selected agent.

In which case, the client device 110 interacts with the selected agent to assist with the task (e.g., by launching a corresponding app and providing information about the intent as launch parameters). Alternatively, the virtual assistant system 150 may send a message to the selected agent which then initiates contact with the user to provide assistance with the task (e.g., by sending a message to the user's client device 110).

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A method, comprising:
    receiving a message from a client device, the message including content obtained from user input;
    applying an intent determination model to the content to identify an intent in an intent ontology, the identified intent corresponding to a task with which the user desires assistance, wherein at least one intent was added to the intent ontology by a process comprising:
        receiving, from a third-party entity, a request to add a new intent to the intent ontology, the request including instructions regarding how to identify the new intent using message content;
        determining whether the new intent is duplicative with existing intents in the intent ontology; and
        adding the new intent to the intent ontology responsive to the new intent being non-duplicative with the existing intents;
    identifying a plurality of digital agents that are capable of servicing the intent by providing assistance with the task, wherein a first digital agent of the plurality of digital agents was subscribed to the intent by:
        receiving a request to subscribe to the intent, the request identifying a first digital agent;
        confirming the first digital agent is capable of servicing the intent; and
        storing an indication that that the first digital agent is available to service the intent;
    retrieving, from a data store, contextual data relating to the message;
    selecting, based on the contextual data, a digital agent of the plurality of digital agents to assist with the task; and
    activating the selected digital agent to provide assistance with the task.

2. The method of claim 1, wherein applying the intent determination model comprises:
    applying a heuristic rule to the content to determine a possible intent based on presence of a specified word or phrase in the content; and
    applying a machine-learned model to the content to determine whether the possible intent corresponds to an actual intent of the user, wherein the identified intent is the actual intent of the user.

3. The method of claim 1, wherein identifying the plurality digital of agents comprises:
    identifying a node in an intent ontology that corresponds to the identified intent; and
    retrieve agent identifiers stored in the identified nodes, wherein each agent identifier identifies a digital agent included in the plurality of digital agents.

4. The method of claim 1, wherein adding the new intent to the intent ontology comprises:
    adding a new node to the intent ontology responsive to the new intent being non-duplicative with the existing intents, wherein the new intent is the identified intent and the new node includes a plurality of agent identifiers that identify the plurality of digital agents.

5. The method of claim 1, wherein selecting the digital agent to assist with the task comprises:
    applying a model to generate an intent resolution score for each of the plurality of digital agents, the intent resolution score for a given digital agent indicating a likelihood that the user would select the given digital agent for assistance with the task; and selecting the digital agent from the plurality of digital agents based on the intent resolution scores.

6. The method of claim 1, wherein the contextual data includes social network data of the user identifying the user's social network contacts, and feedback regarding the given digital agent provided by the user's social network impacts the corresponding intent resolution score generated by the model.

7. The method of claim 1, wherein selecting the digital agent of the plurality of digital agents to assist with the task comprises:
  determining to include the identified intent in an exploration subset based on an exploration probability;
  identifying a subset of the plurality of digital agents based on one or more exploration criteria, the exploration criteria indicating that digital agents included in the subset are new or recently updated relative to digital agents not included in the subset; and
  selecting the digital agent to assist with the task from the subset of the plurality of digital agents.

8. The method of claim 1, wherein activating the selected digital agent comprises sending instructions to the client device to launch an application, the application providing assistance with the task.

9. A non-transitory computer-readable medium storing computer program instructions executable by a processor to perform operations comprising:
  receiving a message from a client device, the message including content obtained from user input;
  applying an intent determination model to the content to identify an intent in an intent ontology, the identified intent corresponding to a task with which the user desires assistance, wherein at least one intent was added to the intent ontology by a process comprising:
    receiving, from a third-party entity, a request to add a new intent to the intent ontology, the request including instructions regarding how to identify the new intent using message content;
    determining whether the new intent is duplicative with existing intents in the intent ontology; and
    adding the new intent to the intent ontology responsive to the new intent being non-duplicative with the existing intents;
  identifying a plurality of digital agents that are capable of servicing the intent by providing assistance with the task, wherein a first digital agent of the plurality of digital agents was subscribed to the intent by:
    receiving a request to subscribe to the intent, the request identifying a first digital agent;
    confirming the first digital agent is capable of servicing the intent; and
    storing an indication that that the first digital agent is available to service the intent;
  retrieving, from a data store, contextual data relating to the message;
  selecting, based on the contextual data, a digital agent of the plurality of digital agents to assist with the task; and
  activating the selected digital agent to provide assistance with the task.

10. The non-transitory computer-readable medium of claim 9, wherein applying the intent determination model comprises:
  applying a heuristic rule to the content to determine a possible intent based on presence of a specified word or phrase in the content; and
  applying a machine-learned model to the content to determine whether the possible intent corresponds to an actual intent of the user, wherein the identified intent is the actual intent of the user.

11. The non-transitory computer-readable medium of claim 9, wherein identifying the plurality of digital agents comprises:
  identifying a node in an intent ontology that corresponds to the identified intent; and
  retrieve agent identifiers stored in the identified nodes, wherein each agent identifier identifies a digital agent included in the plurality of digital agents.

12. The non-transitory computer-readable medium of claim 9, wherein adding the new intent to the intent ontology comprises:
  adding a new node to the intent ontology responsive to the new intent being non-duplicative with the existing intents, wherein the new intent is the identified intent and the new node includes a plurality of agent identifiers that identify the plurality of digital agents.

13. The non-transitory computer-readable medium of claim 9, wherein selecting the digital agent to assist with the task comprises:
  applying a model to generate an intent resolution score for each of the plurality of digital agents, the intent resolution score for a given digital agent indicating a likelihood that the user would select the given digital agent for assistance with the task; and
  selecting the digital agent from the plurality of digital agents based on the intent resolution scores.

14. The non-transitory computer-readable medium of claim 9, wherein selecting the digital agent of the plurality of digital agents to assist with the task comprises:
  determining to include the identified intent in an exploration subset based on an exploration probability;
  identifying a subset of the plurality of digital agents based on one or more exploration criteria, the exploration criteria indicating that digital agents included in the subset are new or recently updated relative to digital agents not included in the subset; and
  selecting the digital agent to assist with the task from the subset of the plurality of digital agents.

15. A computer system comprising:
  one or more processors; and
  one or more computer readable media storing computer program instructions that, when executed, cause the one or more processors to perform operations including:
    receiving a message from a client device, the message including content obtained from user input;
    applying an intent determination model to the content to identify an intent in an intent ontology, the identified intent corresponding to a task with which the user desires assistance, wherein at least one intent was added to the intent ontology by a process comprising:
      receiving, from a third-party entity, a request to add a new intent to the intent ontology, the request including instructions regarding how to identify the new intent using message content;
      determining whether the new intent is duplicative with existing intents in the intent ontology; and
      adding the new intent to the intent ontology responsive to the new intent being non-duplicative with the existing intents;
    identifying a plurality of digital agents that are capable of servicing the intent by providing assistance with the task, wherein a first digital agent of the plurality of digital agents was subscribed to the intent by:

receiving a request to subscribe to the intent, the request identifying a first digital agent;

confirming the first digital agent is capable of servicing the intent; and storing an indication that that the first digital agent is available to service the intent;

retrieving, from a data store, contextual data relating to the message;

selecting, based on the contextual data, a digital agent of the plurality of digital agents to assist with the task; and activating the selected digital agent to provide assistance with the task.

16. The computer system of claim 15, wherein applying the intent determination model comprises:

applying a heuristic rule to the content to determine a possible intent based on presence of a specified word or phrase in the content; and applying a machine-learned model to the content to determine whether the possible intent corresponds to an actual intent of the user, wherein the identified intent is the actual intent of the user.

17. The computer system of claim 15, wherein identifying the plurality of digital agents comprises:

identifying a node in an intent ontology that corresponds to the identified intent; and retrieve agent identifiers stored in the identified nodes, wherein each agent identifier identifies a digital agent included in the plurality of digital agents.

18. The computer system of claim 15, wherein adding the new intent to the intent ontology includes:

adding a new node to the intent ontology responsive to the new intent being non-duplicative with the existing intents, wherein the new intent is the identified intent and the new node includes a plurality of agent identifiers that identify the plurality of digital agents.

19. The computer system of claim 15, wherein selecting the digital agent to assist with the task comprises:

applying a model to generate an intent resolution score for each of the plurality of digital agents, the intent resolution score for a given digital agent indicating a likelihood that the user would select the given digital agent for assistance with the task; and selecting the digital agent from the plurality of digital agents based on the intent resolution scores.

20. The computer system of claim 15, wherein selecting the digital agent of the plurality of digital agents to assist with the task comprises:

determining to include the identified intent in an exploration subset based on an exploration probability;

identifying a subset of the plurality of digital agents based on one or more exploration criteria, the exploration criteria indicating that digital agents included in the subset are new or recently updated relative to digital agents not included in the subset; and selecting the digital agent to assist with the task from the subset of the plurality of digital agents.

\* \* \* \* \*

UNITED STATES PATENT AND TRADEMARK OFFICE
CERTIFICATE OF CORRECTION

PATENT NO. : 10,878,198 B2  
APPLICATION NO. : 16/211414  
DATED : December 29, 2020  
INVENTOR(S) : Anuj Kumar et al.

Page 1 of 1

It is certified that error appears in the above-identified patent and that said Letters Patent is hereby corrected as shown below:

In the Claims

Column 18, Line 30, Claim 1, delete "that that the" and insert -- that the --.

Column 19, Line 52, Claim 9, "that that the" and insert -- that the --.

Column 21, Line 5, Claim 15, delete "that that the" and insert -- that the --.

Signed and Sealed this  
Twenty-sixth Day of July, 2022

Katherine Kelly Vidal  
*Director of the United States Patent and Trademark Office*